United States Patent [19]
D'Amico

[11] 3,803,650
[45] Apr. 16, 1974

[54] DEVICES AS SELECTIVE MASTER LINE-YARN HOLDER-CUTTER STORER IN COMBINATION MEANS

[76] Inventor: Paul M. D'Amico, 2709 S. 12th St., Philadelphia, Pa. 19148

[22] Filed: June 14, 1971

[21] Appl. No.: 152,957

[52] U.S. Cl.................... 7/14.1 R, 242/96, 206/38, 229/92.9, 7/1 H, 206/65 R
[51] Int. Cl............................................ B25f 1/00
[58] Field of Search................ 206/42, 38, 65 R; 229/92.9; 242/85.1, 96; 7/14.1, 1 H

[56] References Cited
UNITED STATES PATENTS
2,687,211  8/1954  Sparks .................................. 206/42
1,454,050  5/1923  Gruenhogen ...................... 242/85.1
2,420,864  5/1947  Carlson ............................. 242/85.1

Primary Examiner—Al Lawrence Smith
Assistant Examiner—Roscoe V. Parker

[57] ABSTRACT

The invention relates to improvements and innovations in a device and accessories for bobbin-lacing, storing and paying out line-yarn and other incidentals such as; lacing cords in varying thicknesses, including fine wire in reel-like form; also, coactingly arresting accidental or unintended unwinding of said line-yarn within the grasp of open-throated cavities arcuately formed with claw-like arms, bifurcated as line-yarn feeler-sensers; wherein said master embodiment also coactingly provides a multitude of chambers for storing a plurality of varied or smaller similar embodiments.

2 Claims, 5 Drawing Figures

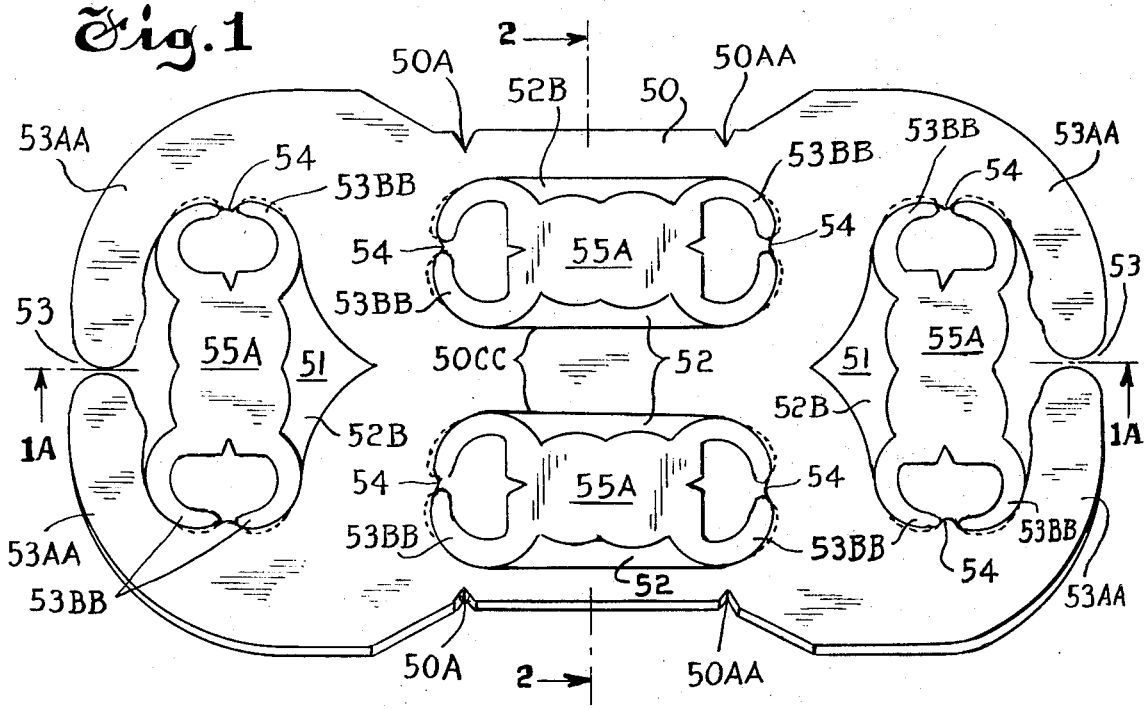
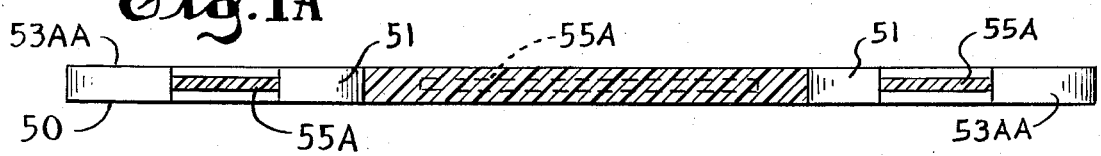
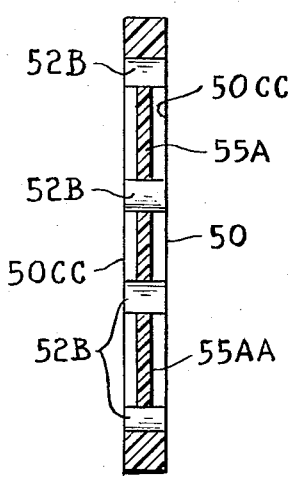
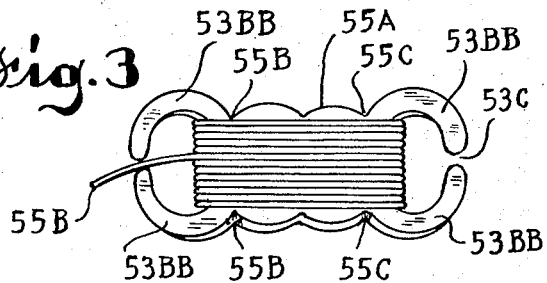
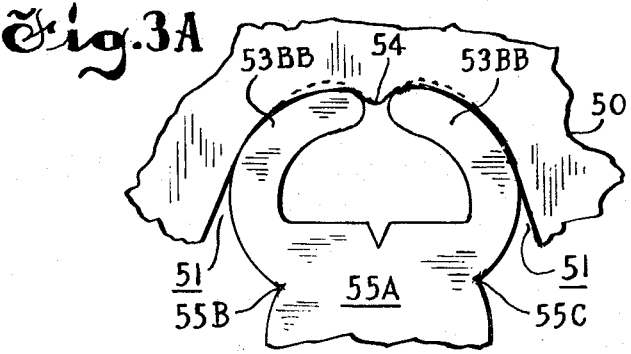

3,803,650

DEVICES AS SELECTIVE MASTER LINE-YARN HOLDER-CUTTER STORER IN COMBINATION MEANS

BRIEF SUMMARY

The invention basically and more particularly concerns in producing a master device as a hand holding embodiment which suitably coacts in line-yarn storing and paying out in reel-like form, which also prevents accidental unwinding, rolling and the usual entanglements of the common ball of twine or yarn; yet, selectively holds, cuts, locks and acts as a bobbin as do the varied and smaller sized bobbins it safely and evereadily stores; and which almost eliminates conventional spools, make-shift methods having cumbersome protrusions for cutting means, since not safely contoured; and the line-winding on a piece of wood as a boy usually would do when flying a kite; or hand-line fishing with a typical loose line which will eventually entangle and delay or cease such intended function otherwise.

Another object of the invention is to produce not only a line-yarn holder which selectively stores smaller bobbins, but co-acts as they do when knitting, crochetting, netting, tying and a multitude of other eveready usages.

Another object of the invention is to produce a device and its nested components, which is light and inexpensive to mass-produce, easily coated in a variety or array of assorted colors and attractively easy to identify.

Another object of the invention is to provide a line-yarn holder-cutter which additively and suitably coacts as a line-yarn cutting and line-yarn locking means, avoiding loose untidy ends.

A further object of the invention is to provide a line-yarn holder-cutter which may be mass-produced in metal, or any of the pliable and deformedable springing materials as is found in the world of plastics, which may be formed, casted or molded by heat and pressure of injection molding machines.

Other objects will be apparent from the following drawings, wherein:

BRIEF DESCRIPTION

FIG. 1 is a top plan view or cross-section of the selective master line-yarn holder-cutter device, supporting and storing a plurality of similar smaller holders embodying the invention.

FIG. 1A is a side sectional view indicating storing means, and looking at directions of 1A to 1A as is shown in FIG. 1.

FIG. 2 is a sectional view indicating storing means, and looking to or from directions of lines 2—2 at narrowed central portion of master embodiment in FIG. 1.

FIG. 3. is a side or plan view of a smaller holder or bobbin as being separated from said master holder shown in FIG. 1 and lineyarn loaded to further indicate relatively flat reel-like operation.

FIG. 3A is a cut-away view to indicate storing at channeled recessed cavity in chamber of master embodiment.

DESCRIPTION OF THE PREFERRED EMBODIMENTS

In the present embodiments of the invention hereinafter described in greater detail, FIG. 1 and the referenced numeral 50 denote the novel line-yarn holder-cutter, which consists of a relatively flat elongated lengthwise rectangular formed plate, which may be made metal-wise with special attention to line-yarn cutting and line-yarn locking means for longer use and durability, or in plastics; and of such overall dimensions, and 0.30 inches in thickness by 4.00 inches in width and 8.00 in length, while said smaller holders 55A will conform to suit permissible storing chambers and recesses 52,52B and aligning cavity 51 being particularly shaped to conform as illustrated, in that these dimensions are approximate without departing from the spirit and scope of said invention; wherein, bifurcated clawlike arms 53AA resiliently coact as line-yarn feeler-sensers and as a fluctuating part of line-yarn entry 53, while said storing chambers 52 and 52B also indicate phantom view of channeled recessed walls 54 to finger-set, to store or dispense smaller sized holders 55A by slight pressure against bifurcated and fluctuating arms 53BB as is shown in FIG. 3 also, which is wound with line-yarn 55BB in eveready position and operation; wherein, line-yarn cutting and or locking is in "V" type cavities shown as 50A and 50AA respectively and as flanking crosswise, as dual-acting means from said narrowed central portion which is also indicated by looking to or from lines 2 to 2, or by said smaller holders 55A at 55B and 55C respectively, and if and when desired each of said embodiments may be manufactured in metal to operatively perform electric wire cutting, insulation skinning and scraping as included in ude as a bobbin for cable harnessing in switchboard or computer work, and the very many drum or selector switches found aboard ships in marine and field.

FIG. 1A in a side sectional view indicates lengthwise positioning of smaller holders 55A in said embodiment 50, with concern to lengthwise arms 53AA and as looking to from lines 1A to 1A as shown in FIG. 1. while:

FIG. 2 in side sectional view indicates crosswise positioning of smaller or assorted sized holders 55A or 55AA respectively, into storing chambers 52 and 52B of said selective master embodiment 50 and as with thickness means 50CC for further clarity of illustration, and FIG. 3 indicates a side or plan view of said smaller sized holder or bobbin 55A, loaded with line or yarn 55BB performing ingress or egress, means from said bifurcated archuate coacting clawlike arms 53BB to complete line-yarn feeler-senser entry or raceway 53C, which is followed by line-yarn cutter 55B and line-yarn lock 55C; wherein it must be noted that accidental or unintended unwinding is also controlled at said entry 53c and at endwise openthroated cavities when said embodiments are hand-held singly and dangling in mid-air. and FIG. 3A is a cut-away view indicating storing and locking means in channeled recesses 54 aided by resilient bifurcated clawlike arms 53BB as positioned in chamber 51 of said master embodiment 50, operatively accommodating said smaller holders 55A and either positioned or dispensed by push-pull finger pressure.

Having described my invention what I claim for U.S. Letters Patent is:

1. A combined master line-yarn holder and receptacle comprising a relatively thin, substantially rectangular plate of pliable material, said plate having first and second end portions and an intermediate central body portion, said first and second end portions each defining a pair of claw-like arms extending arcuately from opposite ends of said central body portion, each defining an elongated and open throated chamber and resiliently coact as feeler-sensers when operatively winding or unwinding said line-yarn on said central body portion while automatically arresting accidental or unintended unwinding, said central body portion having at least one elongated chamber, said elongated chamber defined by each pair of arms and said elongated chamber in said central body each having a recess formed at each end thereof whereby a relatively small line-yarn holder may be snapped into said chamber and be detachably held by said recess.

2. The combined device as set forth in claim 1, wherein the width of said central portion is less than the width of said first and second end portions, said central body portion further including along one edge thereof a V-shaped line-yarn cutting notch and a V-shaped line-yarn locking notch whereby a line yarn may be wound upon said central body in reel-like manner and locked thereon.

* * * * *